United States Patent Office 3,244,684
Patented Apr. 5, 1966

3,244,684
**PROCESS FOR POLYMERIZING CHLOROTRI-
FLUOROETHYLENE**
Fred N. Teumac, Lake Jackson, and Lester W. Harriman, Angleton, Tex., assignors to The Dow Chemical Company, Midland, Mich., a corporation of Delaware
No Drawing. Filed Aug. 2, 1963, Ser. No. 299,485
6 Claims. (Cl. 260—92.1)

This invention concerns a process and catalyst materials for polymerizing chlorotrifluoroethylene.

It is known to polymerize chlorotrifluoroethylene by heating the same in the presence of a per-oxygen catalyst or initiator to form normally solid products suitable for a variety of purposes.

It has now been found that chlorotrifluoroethylene can readily be polymerized by contacting the monomer with an alkali metal fluoride or an alkali metal silicofluoride at elevated temperatures to form products which range from liquid dimers to greases to normally solid polymers capable of being molded or shaped under heat and pressure to form useful articles such as boxes, plates, sheets, rods, bars and the like.

The catalyst materials can be an alkali metal fluoride such as sodium fluoride, potassium fluoride, cesium fluoride, rubidium fluoride, cesium silicofluoride, rubidium silicofluoride, potassium silicofluoride or sodium silicofluoride or mixtures of any two or more of such alkali metal or alkali metal silicofluorides. The catalyst materials are preferably employed in an amount corresponding to from about 0.8 to 1.2 times the weight of the chlorotrifluoroethylene to be reacted, but greater or lesser proportions can be used.

The process can be carried out batchwise or in continuous manner at temperatures between about 120° and 500° C., preferably from 200 to 350° C. and at atmospheric or superatmospheric pressure. The process is preferably carried out batchwise in a closed reactor and under superatmosphereic pressure since pressure increases the rate of reaction.

In practice, the catalyst, e.g. cesium fluoride, in granular form is suspended in a metal cage in a suitable pressure resistant reaction vessel and heated to a suitable reaction temperature. Monomeric chlorotrifluoroethylene is fed to the reaction vessel and maintained under suitable superatmospheric pressure while allowing the reaction to proceed. After completing the polymerization reaction, the products are recovered and separated from one another in usual ways. For example, the liquid dimers are distilled from the reaction products and condensed. The residue consisting principally of grease-like polychlorotrifluoroethylene and solid polymer is suspended in an organic solvent, e.g. perchloroethylene or trichloroethylene, for the grease-like polymer and in which the solid polymer is insoluble, and filtered to recover the solid polymer. The filtrate is evaporated to recover the grease-like polymer.

The following examples illustrate ways in which the principle of the invention has been applied, but are not to be construed as limiting its scope.

*Example 1*

A charge of granular cesium fluoride was enclosed in a nickel screen cage and was suspended in a 500 ml. capacity stainless steel autoclave. The autoclave was evacuated to remove air, then was filled with chlorotrifluoroethylene vapors under pressure and was heated at a temperature of 130° C. and a maximum pressure of 790 pounds per square inch gauge pressure for a period of about 72 hours. Thereafter, the autoclave was cooled, was vented and the products recovered. The conversion was 81.8 percent based on the monochlorotrifluoroethylene initially used. The products were separated. They consisted of liquid polymer, grease polymer and solid polymer. The liquid polymer was recovered by distillation. It was perfluoro-1,2-dichlorocyclobutane. The grease polymer was recovered by dissolving it in perchloroethylene, filtering to separate the solution from the insoluble solid polymer and evaporating the perchloroethylene solvent to recover the grease polymer as residue. The yield of perchloro-1,2-dichlorocyclobutane was 14.5 percent, based on the total polymeric product obtained. The yield of grease polymer was 18.8 percent. The yield of solid polymer was 66.7 percent.

*Example 2*

Vapors of chlorotrifluoroethylene were fed at a rate of 36 grams per hour to a reaction zone and into contact with a bed of granular cesium fluoride at a temperature of 300° C. for a contact time of about 1.8 seconds, then were passed through successive cold traps and were cooled to condense and separate liquid product. The experiment was carried out in continuous manner for a period of 24 hours. The conversion at the start of the experiment was about 48 percent, but decreased with time and was about 6 percent at the end of the 24 hour test period, because of gradual depletion of the cesium fluoride catalyst material during the polymerization reaction. There were obtained 202 grams of polymeric products. The products were separated by distillation. They consisted of 71 percent by weight of liquid polymer, and 29 percent of grease polymers. The liquid product consisted of 1,1,3-trichloroheptafluorobutane,
3,6-dichlorodecafluorobutane,
1,1,4,4-tetrachlorodecafluorohexane, $C_8F_{16}$, $C_{10}F_{10}Cl_2$ isomers of $C_{10}F_{12}Cl_3$, $C_8F_{13}Cl_3$, $C_{10}F_{16}Cl_4$ and higher polymers.

*Example 3*

Chlorotrifluoroethylene was fed at a rate of about 36 grams per hour into contact with a bed of granular cesium fluoride in a reaction zone at a temperature of 360° C. and for a contact time of 1.8. The conversion to polymeric products was 52 percent.

At a temperature of 260° C. the conversion was 9.6 percent.

At a temperature of 260° C., and using either rubidium fluoride, potassium fluoride or cesium silicofluoride, $Cs_2S_2F_6$, as the catalyst or contacting agent, a conversion of from about 7 to 9 percent of the monomer to polymeric products was obtained.

*Example 4*

Chlorotrifluoroethylene was fed to a reaction zone and into contact with rubidium fluoride in granular form at a temperature of 380° C., and for a contact time of about 1.5 seconds. The reacted vapors were cooled to condense liquid product. There was obtained polymeric product consisting of 20 percent by weight of perfluoro-1,2-dichlorocyclobutane boiling at 58.5° C., 20 percent by weight of higher boiling trimers and 60 percent by weight of solid homopolymer of chlorotrifluoroethylene.

*Example 5*

Chlorotrifluoroethylene was fed at a rate of 50 grams per hour to a reaction zone and into contact with a bed 12.5 inches deep of granular cesium fluoride in a stainless steel tube maintained at a temperature of 300° C. for a contact time of about one second. The reacted materials were passed through a series of two cold traps to cool and condense liquid products. After continuing the reaction for a period of several hours, the products were recovered. There was obtained a yield of 35 percent by weight of perfluoro-1,2-dichlorocyclobutane, 5 percent by weight of trimers of chlorotrifluoroethylene and 62 percent of solid homopolymer of chlorotrifluoroethylene.

We claim:

1. A process for polymerizing chlorotrifluoroethylene which comprises contacting chlorotrifluoroethylene with a catalyst material selected from the group consisting of alkali metal fluorides and alkali metal silica fluorides at reaction temperatures between 120° and 500° C.

2. A process as claimed in claim 1 wherein the catalyst material is an alkali metal fluoride.

3. A process as claimed in claim 1 wherein the catalyst material is an alkali metal silicofluoride.

4. A process as claimed in claim 1 wherein the catalyst material is cesium fluoride.

5. A process as claimed in claim 1 wherein the catalyst material is cesium silicofluoride.

6. A process as claimed in claim 1 wherein the catalyst material is rubidium fluoride.

No references cited.

JOSEPH L. SCHOFER, *Primary Examiner.*

JOHN F. McNALLY, *Assistant Examiner.*